(12) United States Patent
Ng-Thow-Hing

(10) Patent No.: US 7,573,477 B2
(45) Date of Patent: Aug. 11, 2009

(54) SYSTEM AND METHOD FOR ACTIVATION-DRIVEN MUSCLE DEFORMATIONS FOR EXISTING CHARACTER MOTION

(75) Inventor: Victor Ng-Thow-Hing, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 11/454,711

(22) Filed: Jun. 15, 2006

(65) Prior Publication Data

US 2006/0286522 A1 Dec. 21, 2006

Related U.S. Application Data

(60) Provisional application No. 60/691,536, filed on Jun. 17, 2005.

(51) Int. Cl.
G06T 15/70 (2006.01)

(52) U.S. Cl. .................... 345/473; 345/474; 345/475

(58) Field of Classification Search .......... 345/473–475
See application file for complete search history.

(56) References Cited

U.S. PATENT DOCUMENTS

| | | | | |
|---|---|---|---|---|
| 5,623,428 A * | 4/1997 | Kunii et al. | | 703/6 |
| 5,625,577 A * | 4/1997 | Kunii et al. | | 703/2 |
| 5,835,693 A * | 11/1998 | Lynch et al. | | 345/473 |
| 5,982,389 A * | 11/1999 | Guenter et al. | | 345/474 |
| 6,057,859 A * | 5/2000 | Handelman et al. | | 345/474 |
| 6,462,742 B1 * | 10/2002 | Rose et al. | | 345/473 |
| 6,683,612 B2 * | 1/2004 | Miyamoto et al. | | 345/474 |
| 6,738,065 B1 * | 5/2004 | Even-Zohar | | 345/473 |
| 6,750,866 B1 * | 6/2004 | Anderson, III | | 345/474 |
| 6,971,267 B2 * | 12/2005 | Kawai et al. | | 73/379.01 |
| 7,217,247 B2 * | 5/2007 | Dariush et al. | | 601/5 |
| 7,251,593 B2 * | 7/2007 | Dariush et al. | | 703/11 |
| 7,390,309 B2 * | 6/2008 | Dariush | | 601/5 |
| 7,402,142 B2 * | 7/2008 | Kawai et al. | | 600/587 |
| 2002/0009222 A1 * | 1/2002 | McGibbon et al. | | 382/154 |
| 2003/0115031 A1 * | 6/2003 | Dariush et al. | | 703/11 |
| 2003/0220714 A1 * | 11/2003 | Nakamura et al. | | 700/245 |
| 2004/0107780 A1 * | 6/2004 | Kawai et al. | | 73/862.08 |
| 2004/0116836 A1 * | 6/2004 | Kawai et al. | | 600/595 |
| 2004/0169656 A1 * | 9/2004 | David Piponi et al. | | 345/473 |
| 2005/0102111 A1 * | 5/2005 | Dariush et al. | | 702/41 |

OTHER PUBLICATIONS

Ng-Thow-Hing, PhD Thesis: "Anatomically based models for physical and geometric reconstruction of animals", University of Toronto, Department of Computer Science, Supervisor: Eugene Fiume, Jan. 2001, 168 pages.*

(Continued)

*Primary Examiner*—Kee M Tung
*Assistant Examiner*—Roberta Prendergast
(74) *Attorney, Agent, or Firm*—Fenwick & West LLP; Mark Duell

(57) ABSTRACT

A system and method for animating a character with activation-driven muscle deformation. External loads can be estimated through an iterative joint torque estimation process, and the external loads reflected in a physical model. Kinematic motion and the physical model reflecting external loads can be used to estimate joint torques. Muscle activations can be determined from the joint torques, and a character can be animated with muscle deformation responsive to the muscle activations.

37 Claims, 4 Drawing Sheets

OTHER PUBLICATIONS

Sardain, et al., "Forces acting on a biped robot. Center of pressure-zero moment point", IEEE Transactions on Systems, Man and Cybernetics, Part A, vol. 34, Issue 5, Sep. 2004, pp. 630-637.*

Soutas-Little, et al., "Role of ground reaction torque and other dynamic measures in postural stability", IEEE Engineering in Medicine and Biology Magazine, vol. 11, Issue 4, Dec. 1992, pp. 28-31.*

Bruderlin, et al., 1989, "Goal-directed, dynamic animation of human walking", Proceedings of the 16th Annual Conference on Computer Graphics and interactive Techniques SIGGRAPH '89, ACM, NY, NY, pp. 233-242.*

Girard, et al., 1985, "Computational modeling for the computer animation of legged figures" SIGGRAPH Computer Graphics, vol. 19, Issue 3, Jul. 1985, pp. 263-270.*

Isaacs et al., 1987, "Controlling dynamic simulation with kinematic constraints", Proceedings of the 14th Annual Conference on Computer Graphics and interactive Techniques, M. C. Stone, Ed., SIGGRAPH '87, ACM, NY, NY, pp. 215-224.*

Kry, et al., "EigenSkin: real time large deformation character skinning in hardware", Proceedings of the 2002 ACM Siggraph/Eurographics Symposium on Computer Animation, Jul. 21-22, 2002, SCA '02. ACM, NY, NY, pp. 153-159.*

Ng-Thow-Hing, Master Thesis: "A Biomechanical Musculotendon Model For Animating Articulated Objects", University of Toronto, Department of Computer Science, Supervisor: Eugene Fiume, Jan. 1994, 144 pages.*

Shao, et al., 2003, "A general joint component framework for realistic articulation in human characters", Proceedings of the 2003 Symposium on interactive 3D Graphics, Apr. 27-30, 2003, I3D '03. ACM, NY, NY, pp. 11-18.*

Shapiro et al., 2005, "Dynamic Animation and Control Environment", Proceedings of Graphics interface 2005, May 9-11, 2005, ACM International Conference Proceeding Series, vol. 112, Canadian Human-Computer Communications Society, School of Computer Science, University of Waterloo, Waterloo, Ontario, pp. 61-70.*

Teran, et al., "Creating and Simulating Skeletal Muscle from the Visible Human Data Set", IEEE TVCG 11, pp. 317-328, 2005.*

Christopher L. Vaughan, et al., "Dynamics of Human Gait", 2nd Edition, 1999, Kiboho Publishers, Western Cape, South Africa, 152 pages.*

Pollard, et al., 2001, "Animation of humanlike characters: Dynamic motion filtering with a physically plausible contact model", Yale Workshop on Adaptive and Learning Systems, pp. 1-7.*

Rose, et al., 1996, "Efficient generation of motion transitions using spacetime constraints", Proceedings of the 23rd Annual Conference on Computer Graphics and interactive Techniques, SIGGRAPH '96, ACM, NY, NY, pp. 147-154.*

Vukobratovic et al., "Zero-Moment Point—Thirty Five Years of its Life." International Journal of Humanoid Robotics, 2004, vol. 1, No. 1, pp. 157-173.*

Jihun Park, Donald S. Fussell, "Forward dynamics based realistic animation of rigid bodies", Computers & Graphics, vol. 21, Issue 4, Haptic Displays in Virtual Environments and Computer Graphics in Korea, Jul.-Aug. 1997, pp. 483-496.*

AEM Design, 2000, [online] [Retrieved on Aug. 3, 2006] Retrieved from the Internet<URL:http://www.aemdesigin.com>.

Allen, B. et al., "Articulated Body Deformation from Range Scan Data," ACM Transactions on Graphics (ACM SIGGRAPH 2002), 2002, pp. 612-619, vol. 21, No. 3.

Anderson, F. et al., "Static and Dynamic Optimization Solutions for Gait are Practically Equivalent," Journal of Biomechanics, 2001, pp. 153-161, vol. 34.

Aubel, A. et al., "Realistic Deformation of Human Body Shapes," Computer Animation and Simulation '00, 2000, pp. 125-135.

Capell, S. et al., "Interactive Skeleton-Driven Dynamic Deformations," In Proceedings of the 29$^{th}$ Annual Conference on Computer Graphics and Interactive Techniques, 2002, pp. 586-593.

Chen, D.T. et al., "Pump It Up: Computer Animation of a Biomechanically Based Modelof Muscle Using the Finite Element Method," Computer Graphics (SIGGRAPH '92 Proceedings), 1992, pp. 89-98, vol. 26.

Clauser, C. et al., "Weight, Volume, and Center of Mass of Segments of the Human Body," Aerospace Medical Research Laboratory, Wright-Patterson Air Force Base, Ohio, Aug. 1969, pp. 1-101.

Crowninshield, R.D., "Use of Optimization Techniques to Predict Muscle Forces," Transactions of the ASME 100, 1978, pp. 88-92.

Curious Labs, 2002, Poser 5 Review—IT Reviews, [online] [Retrieved on Aug. 4, 2006] Retrieved from the Internet<URL:www.itreviews.co.uk/software/s177.htm>.

Daz Productions—3D Models, 3D Content, and 3D Software, [online] [Retrieved Aug. 4, 2006] Retrieved from the Internet<URL:http://www.daz3d.com/products/m3.php>.

Delp, S.L. et al., "An Interactive Graphics-Based Model of the Lower Extremity to Study Orthopaedic Surgical Procedures," IEEE Transactiosn on Biomedical Engineering, 1990, pp. 757-767, vol. 37, No. 8.

Faloutsos, P. et al., "Composable Controllers for Physics-Based Character Animation," Computer Graphics (SIGGRAPH 2001 Proceeedings), ACM Press/ACM Siggraph, E. Fiume, ed., 2001, pp. 251-260.

Hodgins, J.K. et al., "Animating Human Athletics," Computer Graphics (SIGGRAPH '95 Proceedings), 1995, pp. 71-78, vol. 29.

Hollars, M.G. et al., "Sd/fast," Symbolic Dynamics, 1991, [online] Retrieved from the Internet<URL:http://www.symdyn.com>.

James, D.L. et al., "Dyrt: Dynamic Response Textures for Real Time Deformation Simulation with Graphics Hardware," Proceedings of the 29$^{th}$ Annual Conference on Computer Graphics and Interactive Techniques, ACM Press, 2002, pp. 582-585.

Kahler, K. et al., "Geometry-Based Muscle Modeling for Facial Animation," Graphics Interface, 2001, pp. 37-46.

Komura, T. et al., "A Muscle-Based Feed-Forward Controller of the Human Body," Computer Graphics Forum, 1997, pp. 165-176, vol. 16.

Lewis, J.P. et al., "Pose Space Deformation: A Unified Approach to Shape Interpolation and Skeleton-Driven Deformation," Computer Graphics (SIGGRAPH 2000 Proceedings), 2000, pp. 165-172.

Mirtich, B., "Fast and Accurate Computation of Polyhedral Mass Properties," Journal of Graphics Tools, 1996, pp. 31-50, vol. 1, No. 2.

Neff, M. et al., "Modeling Tension and Relaxation for Computer Animation," Proceedings of the 2002 ACM SIGGRAPH/Eurographics Symposium on Computer Animation, ACM Press, 2002, pp. 81-88.

Ng-Thow-Hing, V. et al., "Application-Specific Muscle Representations," Proc. Graphics Interface, 2002, pp. 107-116.

O'Rourke, J., *Computational Geometry in C*, 2$^{nd}$ ed., Cambridge University Press, 1998, pp. 63-100.

Popovic, Z. et al., "Physically Based Motion Transformation," Proceedings of the 26$^{th}$ Annual Conference on Computer Graphics and Interactive Techniques, ACM Press/Addison-Wesley Publishing Co., 1999, pp. 11-20.

Scheepers, F. et al., "Anatomy-Based Modeling of the Human Musculature," Computer Graphics (SIGGRAPH '97 Proceedings), 1997, pp. 163-172.

Sloan, P. et al., "Shape by Example," Proceedings of the 2001 Symposium on Interactive 3D Graphics, 2001, pp. 135-143.

Teran, J. et al., "Finite Volume Methods for the Simulation of Skeletal Muscle," Proceedings of the ACM SIGGRAPH/Eurographics Symposium on Computer Animation, 2003, pp. 68-74.

Turner, R. et al., "Interactive Constructions and Animation of Layered Elastically Deformable Characters," Computer Graphics Forum, 1998, pp. 135-152, vol. 17.

Vaughan, C.L. et al., *Dynamics of Human Gait*, 2 ed., 152 pages, Kiboho Publishers, 1999.

Vukobratic, M. et al., *Scientific Fundamentals of Robotics 7: Biped Locomotion*, pp. 1-52, Springer Verlag, 1990.

Wang, X.C. et al., Multi-Weight Envenloping: Least-Squares Approximation Techniques for Skin Animation, 2002 ACM SIGGRAPH Symposium on Computer Animation, 2002, pp. 129-138.

Wilhelms, J. et al., "Anatomically Based Modeling," Computer Graphics (SIGGRAPH '97 Proceedings), 1997, pp. 173-180.

Witkin, A. et al., "Spacetime Constraints," Computer Graphics (SIGGRAPH '88 Proceedings), J. Dill, ed., 1988, pp. 159-168, vol. 22.

Zajac, F.E., "Muscle and Tendon: Properties, Models, Scaling, and Application to Biomechanics and Motor Control," Critical Reviews in Biomedical Engineering, 1989, pp. 359-411, vol. 17, No. 4.

Zordon, V.B. et al., "Motion Capture-Driven Simulations That Hit and React," Proceedings of the 2002 ACM SIGGRAPH/Eurographics Symposium on Computer Animation, ACM Press, 2002, pp. 89-96.

PCT International Search Report and Written Opinion, PCT/US2006/23534, Aug. 4, 2008.

* cited by examiner

SYSTEM AND METHOD FOR ACTIVATION-DRIVEN MUSCLE DEFORMATIONS FOR EXISTING CHARACTER MOTION

RELATED APPLICATIONS

This application claims benefit from U.S. provisional application No. 60/691,536, filed on Jun. 17, 2005 by Victor Ng-Thow-Hing et al, which is incorporated by reference herein in its entirety.

BACKGROUND OF THE INVENTION

1. Field of the Invention

The invention relates to character animation, and specifically to muscle deformation of an animated character.

2. Description of Background Art

Computer-generated graphics have achieved the ability to create astonishingly photorealistic stationary characters. However, when these characters are animated, their realism typically suffers. It is common for viewers to complain that computer-animated characters sometimes move rigidly, unnaturally, and without convincing liveliness.

One important aspect of the animation of lifelike characters is realistic muscle deformation. After all, most characters are more than just bones and joints, and ignoring the deformation of muscles tends to produce motion that is lifeless and plastic.

One approach to muscle deformation is to define a muscle or muscle-deformed skin mesh (muscle-based mesh) for various sample poses of a character. The muscle-based mesh for other poses can be interpolated from the muscles meshes of the sample poses. However, this approach has serious limitations in its ability to produce lifelike characters. Since the sample poses are usually made up of only joint angles, the interpolated muscle deformations cannot react to changes in pose transition speed or external loads acting on the character. Muscles deform, but the deformation is not responsive to the same physical forces as those acting on a real character.

Existing techniques for muscle deformation fail to adequately account for external loads, gravity, acceleration, and non-zero character velocity. Therefore, what is needed is a system and method for muscle deformation capable of reflecting external loads, gravity, acceleration, and non-zero character velocity.

SUMMARY OF THE INVENTION

The invention is a system and method for activation-driven muscle deformation. Kinematic motion and a physical model are used to estimate joint torques that include external loads. Muscle activations are determined from the estimated joint torques, and a character is animated with muscle deformation responsive to the muscle activations.

External loads and muscle activations are estimated through a two-step joint torque determination process. A first set of estimated joint torques are estimated from the kinematic motion and the physical model. The first set of estimated joint torques includes an artificial external load (also called an "artificial load"). An artificial external load is an apparent load that is caused by a force and/or torque acting on an object, but without a naturally occurring source in the environment. A non-zero artificial load typically indicates the presence of unaccounted for external loads. This artificial external load from the first set of estimated joint torques is redistributed to various points on the body to estimate physically-realizable external loads, which can be explained as physical interactions with the environment (like contact forces with the ground). The external load is applied to the physical model to produce a loaded physical model, and a second set of estimated joint torques are estimated from the kinematic motion and the loaded physical model. The second set of estimated joint torques include the effects of the external loads on the physical system, making them more physically realistic. Muscle activations are determined from the second set of estimated joint torques, and a character is animated with muscle deformation responsive to the muscle activations. By including the effect of external loads and accelerations in the muscle activations, convincing characters with lifelike muscle deformations can be animated.

DETAILED DESCRIPTION OF THE PREFERRED EMBODIMENTS

Figure 1:
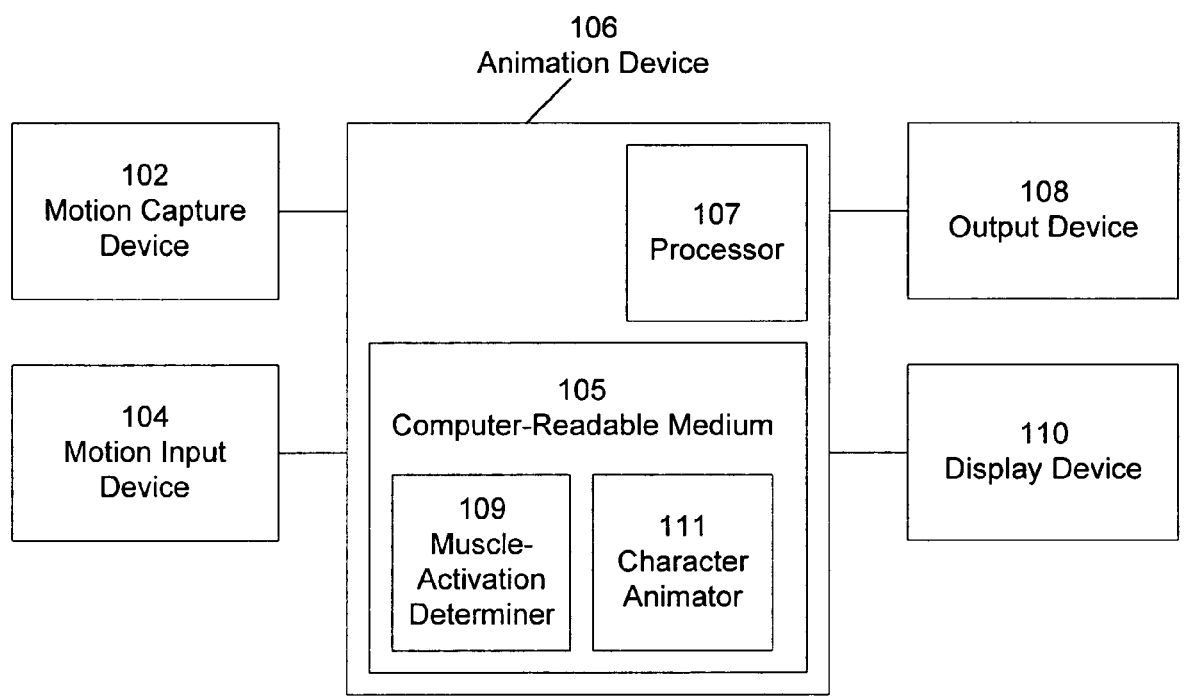
FIG. 1 illustrates a system for animating a visual character, according to one embodiment of the present invention.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

In the physical world, muscle activation is influenced by external loads such ground reaction load, burdens, external resistance, and so on. For an animated character to be convincing, its muscle deformation should reflect the external loads of the environment in which that character is moving. According to one embodiment of the present invention, external loads are applied to a physical model of a character for determining muscle activation, resulting in convincing characters with realistic muscle deformation. The external loads of the character's environment can be based on phenomena encountered in the physical world (such as friction, contact with the environment and gravity) or they can be based on invented fantasy phenomena such as artificial or time-varying force fields, like changing gravity fields.

A load is a vector containing force and/or torque components that act on an object, such as the animated character. A non-zero load has a non-zero force component, a non-zero torque component, or some combination of both. An external load is a load that is caused by a force or torque generated or applied outside the object. In the example of an animated character, an external load is any load not caused by the activation of the character's muscles. One example of an external load used throughout this description is a ground reaction load. A ground reaction load (also commonly known as "ground reaction force") is the load exerted by a surface supporting an object resting upon it.

External loads can be either estimated or measured directly. External loads can be measured directly, for example, by force plates that measure the force and torque exerted by the ground on a physical actor. Force plates can provide accurate force and torque data, but they are also expensive, and limiting in the range of area in which the physical actor can perform. Furthermore, a single force plate cannot resolve the individual loads acting on each foot when there is more than one foot is resting on the ground. Estimating external loads does not require measurement equipment and provides more freedom of motion in comparison to using force plates. Furthermore, estimating external loads allows for the determination of muscle activations when direct measurement is difficult. For example, motion libraries are available providing a wide array of existing motions. However, most motion libraries do not include previously determined external load data. By estimating external loads, kinematic motion obtained from existing motion libraries can be used for the animation of activation driven muscle deformation in characters.

According to one embodiment of the present invention, external loads are determined by estimating joint torques and analyzing the resulting artificial load. An artificial load is an apparent load that is caused by a nonexistent or implausible force acting on an object. Sometimes known as a "body force", a non-zero artificial load indicates that an external load is unaccounted for somewhere in the model. One common occurrence of a non-zero artificial load occurs when a model fails to account for the ground reaction forces acting on an object. If joint torques are estimated without accounting for ground reaction forces, a "body force" may appear to be holding the object in place. Muscle activations based on joint torques estimated without accounting for ground reaction forces will tend to understate the activation of lower-body muscle groups.

According to one embodiment of the present invention, an artificial load is used to determine the unaccounted for external load. Joint torques can then be estimated with consideration of the external load, and the estimated joint torques can be used to determine muscle activation. By accounting for external load, the activation of muscle groups on a character can be depicted with realistic deformations for the various poses and actions of the character.

FIG. 1 illustrates a system for visually animating a character, according to one embodiment of the present invention. The animation device 106 is configured to receive the kinematic motion of a real or virtual actor, determine muscle activations, and animate a character with muscle deformation responsive to those muscle activations.

The animation device 106 can be implemented using a general-purpose computer system, and/or specially designed animation hardware. The animation device 106 includes one or more processors 107, which is/are capable of executing instructions stored on the computer-readable medium 105. The computer-readable medium 105 includes a muscle-activation determiner 109 and a character animator 111. Various methods used by the muscle activation determiner 109 are described herein with reference to FIGS. 2-4.

The character animator 111 can implement any of the available techniques known for animating characters with deformable muscles. The muscle deformation of the characters produced by the character animator 111 are responsive to muscle activations determined by the muscle-activation determiner 109.

The animation device can be optionally connected to a motion capture device 102. The motion capture device 102 is capable of capturing motion from a real actor. For example, the motion capture device 102 can use labeled or unlabelled markers, motion sensors, or other known techniques for capturing motion. Other examples will be apparent to one of skill in the art without departing from the scope of the present invention.

The animation device can also be optionally connected to a motion input device 104. The motion input device 104 is capable of receiving motion input. For example, the motion input device 104 can be operated by a human animator to position an avatar in a series of positions. As another example, the motion input device 104 can receive direct motion input, for example, from a joystick or touch pad. As yet another example, the motion input device 104 can be a computer-readable medium on which motions have been electronically recorded. Other examples will be apparent to one of skill in the art without departing from the scope of the present invention.

The animated character produced by the character animator 111 can be output on a variety of devices. For example, the animation device 106 can be connected to a display device 110, upon which the animated character is displayed. As another example, the animation device 106 can be connected to an output device 108, which stores, transmits, or actuates the animated character. These examples of devices for output or display have been given for the purposes of illustration and are not limiting. Other examples will be apparent to one of skill in the art without departing from the scope of the present invention.

Figure 2:
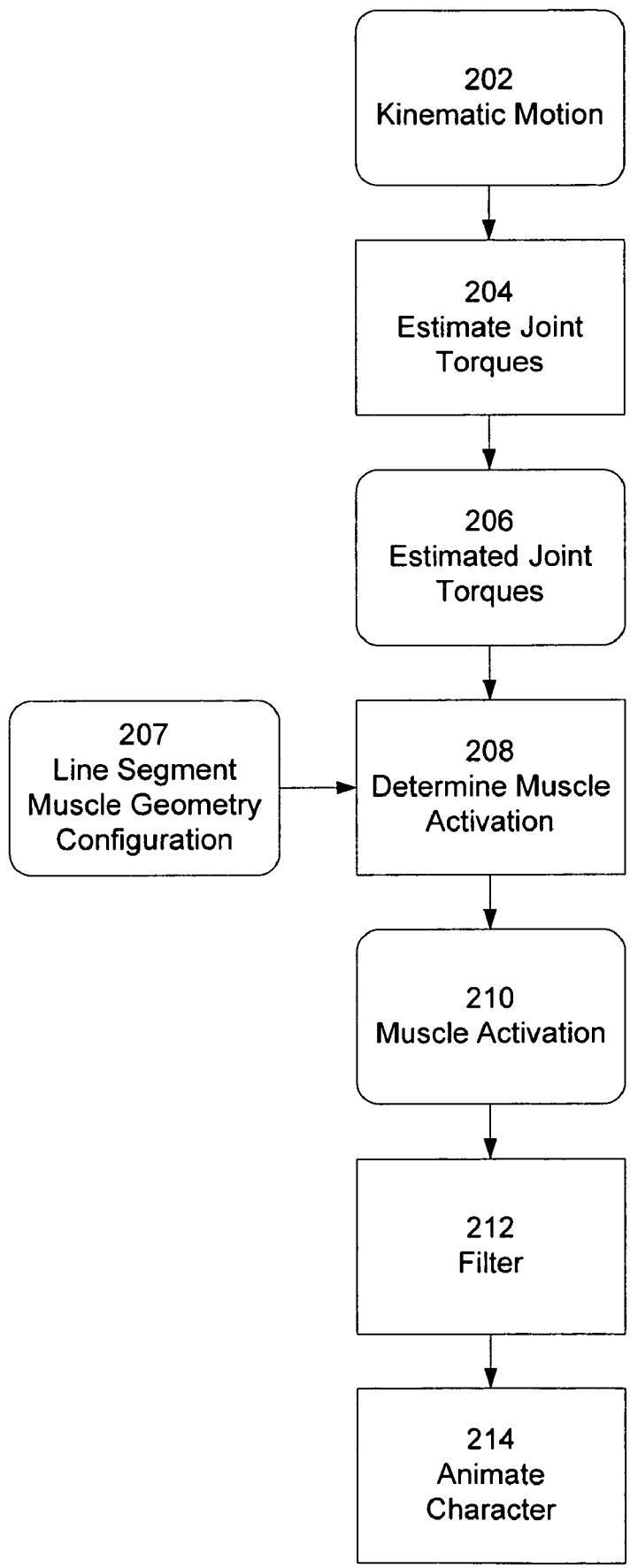
FIG. 2 illustrates a method for determining muscle activation, according to one embodiment of the present invention.

Referring now to FIG. 2, a method for determining muscle activation is illustrated, according to one embodiment of the present invention. In one embodiment, the method is performed by the muscle-activation determiner 109.

The method begins with kinematic motion 202. Kinematic motion is a set of the values over time of one or more joint angles or positions (for example, in the case of translational or slider joints) of an animated character. For example, kinematic motion could be given as a single joint angle and its time derivatives. As another example, kinematic motion could be given as a plurality of joint angles and their values at various time samples. Kinematic motion can describe the change in pose over time of any articulated object.

The kinematic motion 202 can be obtained in a variety of ways. For example, kinematic motion 202 can be obtained by motion capture, dynamic simulation, keyframed animation (in which the kinematic motion is obtained from a set of keyframes), procedural animation (in which user-specified parameters are mapped to kinematic motion), or from a motion library. According to one embodiment of the present invention, fitting a kinematic skeleton to motion captured data to obtain joint angle trajectories can be implemented using methods such as the marker-based anthropomorphic skeletal motion fitting described in "Anthropometry-based Skeleton Fitting," U.S. patent application Ser. No. 10/284,798, filed on Oct. 30 2002, which is hereby incorporated by reference in its entirety. Other examples of methods for obtaining kinematic motion will be apparent to one of skill in the art without departing from the scope of the present invention.

In some implementations, kinematic motion can be obtained from an actor having different joint and segment properties than those of the animated character. The kinematic motion obtained from motion capture, for example, may describe the joint angles of the actor from which the motion was captured. In these cases, the obtained kinematic motion can be retargeted so that the kinematic motion 202 describes the joint angles of the animated character.

According to one embodiment of the present invention, the kinematic motion 202 is filtered. The kinematic motion 202 can be filtered using any available infinite (IIR) or finite (FIR) impulse response filter. The kinematic motion 202 is typically filtered with a low-pass filter. For example, the kinematic motion 202 can be filtered with a fourth order FIR low-pass Butterworth filter.

Joint torques 206 are estimated 204 from the kinematic motion 202. A method for estimating 204 joint torques is described herein with reference to FIG. 3. The estimated joint torques 206 describe the torque on the joints of the animated character. According to one embodiment of the present invention, the estimated joint torques 206 reflect the acceleration, velocities, and positions of the kinematic motion as well as the external loads of the character.

According to one embodiment of the present invention, the estimated joint torques 206 are filtered. The estimated joint torques 206 can be filtered using any available infinite (IIR) or finite (FIR) impulse response filter. The estimated joint torques 206 are typically filtered with a low-pass filter. For example, the estimated joint torques 206 can be filtered with a fourth order FIR low-pass Butterworth filter.

From the estimated joint torques 206, muscle activations 210 are determined 208. A muscle activation 210 is a value indicating the degree of activation of a specific muscle of a model. According to one embodiment of the present invention, muscle activations 210 can be determined 208 for a joint using a muscle force distribution method. Muscle activations 210 are optimized subject to the constraint that the torque resulting from the net muscle force on the joint produce the appropriate joint torque. The torque resulting from the net muscle force on a joint can be given, for example, as the sum of the product, for each muscle, of the muscle force and the moment arm, for all muscles acting on the joint, plus any residual torque:

$$\Gamma_j = \sum_{m \in M} r_{m,j} f_m + \Gamma_{resid,j}$$

where $r_{m,j}$ is the moment arm for a muscle m acting on a joint j, $f_m$ is the force of the muscle m, and M is the set of all muscles acting on joint j.

The moment arm for each muscle can be determined from a line segment muscle geometry configuration 207, also known as a "line segment model." The line segment muscle geometry configuration 207 can be based, for example, on either a generic or custom kinematic model. A line segment model has been shown here for the purposes of illustration, but other methods for determining the moment arm for a muscle will be apparent to one of skill in the art without departing from the scope of the present invention.

The muscle force is a function of the muscle activation, and can be determined, for example, using a muscle force model or a piecewise line segment model. Examples of muscle force models include, but are not limited to, the linear maximum force model and the Hill muscle model. A muscle force model can be any function expressing force in terms of activation. Some muscle force models also include parameters such as muscle length and velocity of shortening. Other muscle force models are adapted to activation of non-muscle forces exerted by the character. For example, a muscle force model might give actuator ("muscle") force in terms of current ("activation"). These examples have been given for the purposes of illustration, but other examples of muscle force models will be apparent to one of skill in the art without departing from the scope of the present invention.

According to one embodiment of the present invention, muscle activations can be subject to a minimum activation constraint. Muscle activations are optimized subject to the constraints that the resulting net muscle force produce the appropriate joint torque and that certain muscle activations exceed a given activation value. For example, a minimum activation might specify that the character's quadriceps must be at least 50% activated. Determining 208 muscle activation subject to a minimum muscle facilitation allows the animated character to convincingly depict anticipatory muscle tension, isometric flexing, twitching, and other musculotary phenomena.

According to one embodiment of the present invention, the muscle activations 210 are filtered 212. The muscle activations 210 can be filtered 212 using any available infinite (IIR) or finite (FIR) impulse response filter. The muscle activations 210 are typically filtered with a low-pass filter. For example, the muscle activations 210 can be filtered with a fourth order FIR low-pass Butterworth filter.

A character is animated 214 with muscle deformation responsive to the muscle activations 210. For example, a muscle activation 210 can be used to determine how a muscle on the character should be deformed. The character is then animated with the appropriately deformed muscle, resulting in an animated character with activation driven muscle deformation. The animated character can be any character with a physical or virtual embodiment, with any number of properties grounded in either reality or fantasy.

Muscle deformation is a change in the appearance of one or more muscles. Muscle deformation is responsive to muscle activation if a change to muscle activation results in a change in the appearance of that muscle's shape, or in a change in the appearance of the surrounding skin model. For example, an activated bicep will typically look larger, and perhaps take a different shape, when compared to a less activated bicep. Characters muscles can be deformed, for example, using a deformable skin model, finite element simulation, a color model and/or a parameterized muscle model. Other methods for deforming muscles responsive to muscle activation will be apparent to one of skill in the art without departing from the scope of the present invention.

Animating a character with activation-driven muscles activations makes the character's movements more realistic, with the possibility of different muscle deformations for different types of loads and movements. For example, the muscles of an arm will contract differently if the arm is carrying a weight versus if the arm is not carrying anything at all. As another example, the muscles of a fast-moving arm will contract differently than the muscles of a slow-moving arm. By deforming muscle movements differently for various loads and movements, the forces and tensions of the character's environment can be convincingly depicted in the finished animation.

Figure 3:
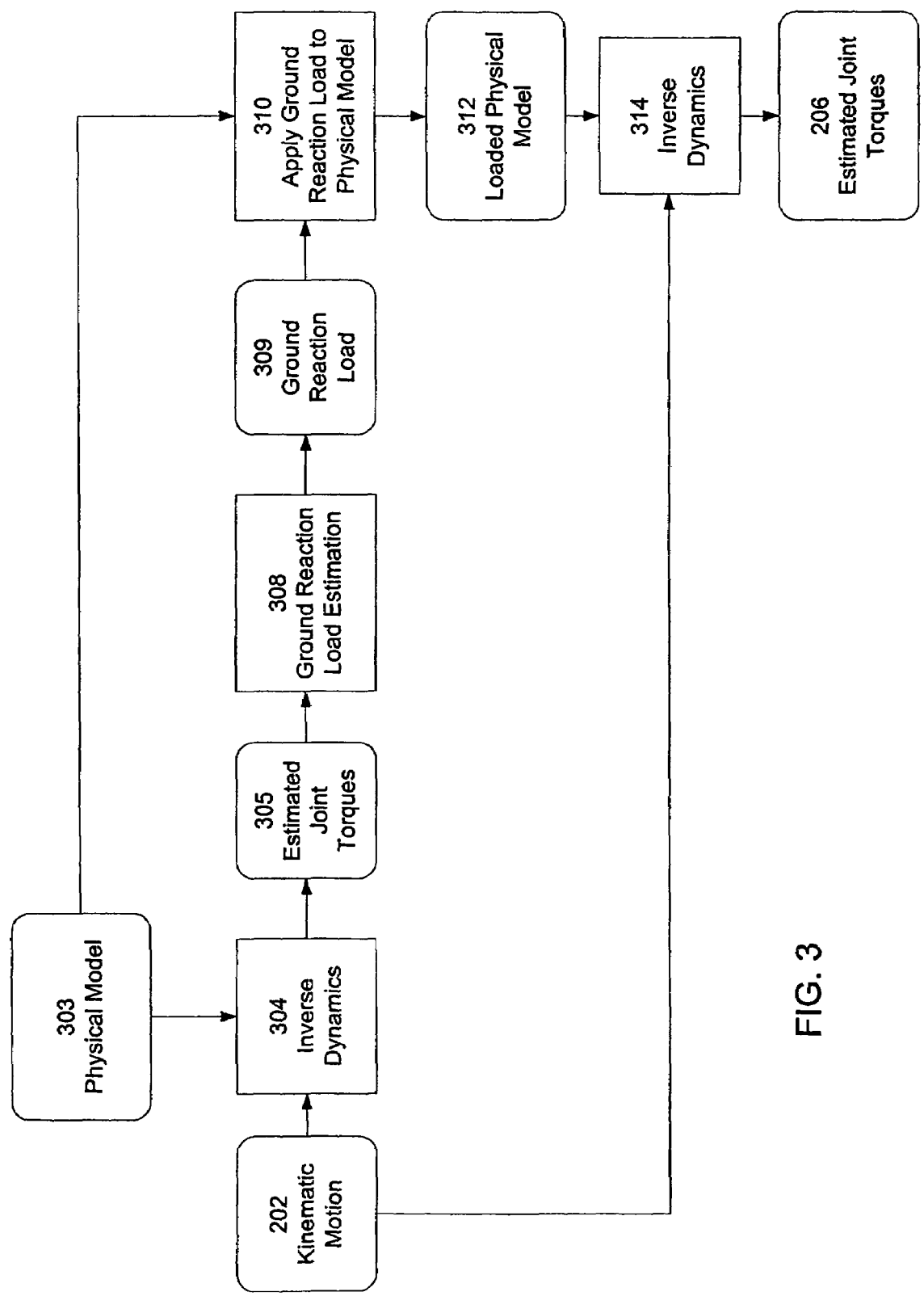
FIG. 3 illustrates a method for determining joint torques with estimation of external loads, according to one embodiment of the present invention.

Referring now to FIG. 3, a method for determining joint torques with estimation of external loads is illustrated according to one embodiment of the present invention. The inverse dynamics 304 determines the estimated joint torques 305 from the kinematic motion 202 and a physical model 303. The physical model 303 is a kinematic joint model (composed of joints and limbs) with segment mass properties. The physical model 303 describes the lengths of the limbs, the distribution of mass over the limbs, and, optionally, the types of joints between the limbs. The physical model 303 can be obtained or modified, for example, from a generic or custom kinematic joint model, mass set fitting with B-spline solids, anthropomorphic mass data, and/or anthropomorphic skeletal fitting (for example, as described in the "Anthropometry-based Skeleton Fitting" application). The mass distribution over the limbs can be configured, for example, to reflect muscle size and shape, fat, bone density, and/or any extra weight or clothing which the character may be carrying. Other methods applicable to the present invention for estimating mass distribution of an object are also described in "Mass Set Estimation for an Object using Variable Geometric Shapes," U.S. patent application Ser. No. 10/877,713 filed on Jun. 24, 2004, which is hereby incorporated by reference in its entirety. The kinematic motion 202 is oriented with respect to a ground, and so the kinematic motion 202 and the physical model 303 can be used to determine the external load due to gravity.

Inverse dynamics 304 are used to determine estimated joint torques 305. Typically, torques of a set of joints are given with reference to other joints in the set. The torque of a first joint is given with reference to another joint (often called a parent) having a common connecting segment. The torque of the parent joint in turn is given with reference to its parent joint, and torques are described with reference up the hierarchy of joints.

For example, in the case of a humanoid character, the joint of the big toe might be given with reference to the ankle joint, the torque of which is given with reference to the knee joint, the torque of which is given with reference to the hip joint, and so on. For the body to exert and bear external loads, at least one of these joints will be given with reference to an external object or reference frame. For example, in many human models the torque of each joint is given with reference to its hierarchical parent. A torque of a joint at the top of the hierarchy (often the pelvis) is given with reference to an external reference frame. While it is the joint at the top of the hierarchy that has a torque given with reference to the environment, often this joint does not, in reality, exert loads on the environment. In these cases, the torque is artificial, because the torque applied on the joint with reference to the environment is physically implausible or unrealistic.

The estimated joint torques 305 describe the torque on the joints of the animated character, but do not typically account for external loads other than gravity. Because other external loads have not been accounted for, the estimated joint torques 305 will often include a non-zero artificial load in the form of an external torque on a joint that does not in reality exert that torque. As an example, in a human model an external load may seem to be present on the pelvis. If the pelvis is not exerting torque on the environment, this external load may be entirely an artificial load. Thus an artificial load can be understood to be contained in the estimated joint torques 305. The artificial load is composed of those estimated joint torques 305 that are exerted on the environment and which are known to be physically implausible.

The artificial load of the estimated joint torques 305 is used to determine an external load that can be explained by naturally-occurring phenomena. For example, the ground reaction load 309 can be estimated 308 from the estimated joint torques 305. A method for estimating 308 ground reaction load is described herein with reference to FIG. 4.

The external load is applied to the physical model 303 to produce a loaded physical model 312. For example, the ground reaction load 309 can be applied 310 to individual centers of pressure on the physical model 303. The loaded physical model 312 includes external loads that are acting on the physical model 303.

Inverse dynamics 314 are used to determine estimated joint torques 206. Because the inverse dynamics 314 are based on a loaded physical model 312 with estimated external loads, the estimated joint torques 206 will more closely reflect the actual torque on the joints as experienced by the animated character. Because the external loads have been determined and applied to the physical model, the estimated joint torques 206 will tend to reflect the actual exertions of the character's muscles, rather than relying on implausible or non-physical forces to explain the motion of the character. Therefore, the estimated joint torques 206 are well-suited for determination of muscle activation to be used for convincing character animation.

Figure 4:
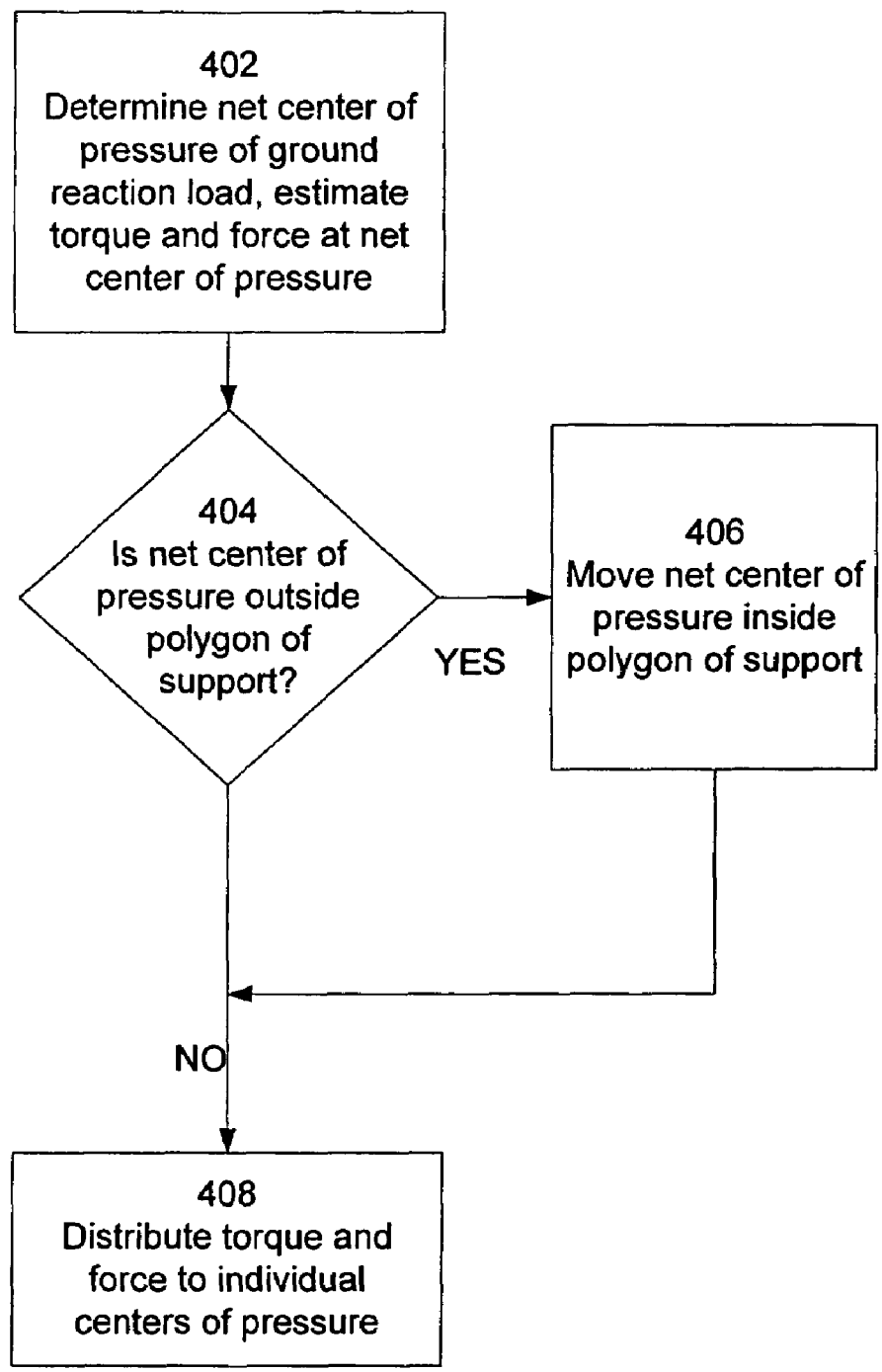
FIG. 4 illustrates a method for estimating ground reaction loads, according to one embodiment of the present invention.

FIG. 4 illustrates a method for estimating ground reaction loads, according to one embodiment of the present invention. The method is typically used to determine plausible external loads from non-zero artificial loads. Ground reaction loads are given herein as an example of plausible external loads, but depending on the environment and activities of the animated character, it may desirable to determine other kinds of external loads.

A net center of pressure of the ground reaction load, as well as the torque and force of the ground reaction load at the net center of pressure are determined 402. The net center of pressure is a point on the ground at which the artificial load can be transferred to a ground reaction load. For example, if the artificial load has some non-zero torque and force applied at the pelvis, the net center of pressure is the point on the ground at which the ground reaction load should be applied to reduce or eliminate the appearance of artificial loads acting on the physical model.

Several physical properties are useful for estimating the net center of pressure and the torque and force of the ground reaction load at the net center of pressure. To transfer the artificial load to a ground reaction load, the force component of the ground reaction load should have the same magnitude and direction as the force component of the artificial load. Therefore, the force at the net center of pressure can be determined from the force of the artificial load:

$$f_{ground} = f_{artificial}$$

To transfer the artificial load to a ground reaction load, the torque of the ground reaction load will depend on the location of the net center of pressure. The torque of the artificial load can be written in terms of the net center of pressure, and the torque and the force of the ground reaction load at the net center of pressure:

$$\Gamma_{artificial} = \Gamma_{ground} + r \times f_{ground}$$

where r is the vector between the location at which the artificial load is applied and the net center of pressure. The torque components at the net center of pressure within the ground plane can be assumed to be zero. The torque component around the axis normal to the ground plane is the only unknown component of ground reaction load torque. Furthermore, because the net center of pressure is located on the ground plane, the two-dimensional net center of pressure location coordinates in the ground plane are the only unknown components of the location of the net center of pressure.

Thus the net center of pressure of the ground reaction load, and the torque and force of the ground reaction load at the net center of pressure can be determined 402 by calculating the location of the net center of pressure in the ground plane and the torque at the net center of pressure around the axis normal to the ground plane.

The assumptions, observations, and methods described herein for determining the ground reaction load have been given for the purposes of illustration only and are not limiting. Other methods will be apparent to one of skill in the art without departing from the scope of the present invention.

A determination 404 is made whether the net center of pressure is outside the polygon of support. A polygon of support is a convex, closed shape that includes all points, and all lines connecting those points, at which the animated character is touching the ground. For example, a character with two feet on the ground would have a polygon of support that includes both feet and an area between the two feet.

If it is determined 404 that the estimated net center of pressure is outside the polygon of support, the net center of pressure is moved 406 inside the polygon of support. For example, the net center of pressure can be moved 406 to the closest point inside the polygon of support from its original position. It is physically implausible for the actual net center of pressure to be outside the polygon of support. The estimated 402 net center of pressure may be outside the polygon of support, for example, if an animator is attempting to model a character in a physically untenable position given the character's mass distribution. Moving 406 the net center of pressure inside the polygon of support provides a physically plausible ground reaction force.

The torque and force are distributed 408 to the individual centers of pressure. An individual center of pressure corresponds to a point of contact with the environment. For example an individual center of pressure can be the center of pressure of the contact points associated with a specific body part. According to one embodiment of the present invention, ground reaction loads are distributed over the character's points of contact with the ground. The component of the load distributed to point of contact (a limb, for example) can be approximated as occurring at a single individual center of pressure. For example, a character with two feet on the ground might have two individual center of pressures, one for each foot. The ground reaction load can be distributed 408 to the individual centers of pressure of each foot based on the relative distance between each individual center of pressure and the estimated net center of pressure of the ground reaction load within the polygon of support. An individual center of pressure closer to the net center of pressure of the ground reaction load would bear more of the ground reaction load in comparison to an individual center of pressure farther from the net center of pressure of the ground reaction load. These methods of distributing ground reaction loads have been given for the purposes of illustration, but any known method for distributing a load over a plurality of points can be used without departing from the scope of the present invention.

The individual centers of pressure need not be limited to the characters feet. For example, a character doing a handstand might have ground reaction forces applied exclusively to his hands. As another example, a fantasy character with nine legs could have ground reaction forces applied to all nine legs (or to a subset of the nine legs, for example, as the character shifts, walks, climbs, and so on). Furthermore, in the course of character movement it is common for the points of contact with the ground to change over time. The individual centers of pressure to which force is distributed can change as a character walks, jumps, performs cartwheels, and so on. Changing the individual centers of pressure which support a character as it moves facilitates the realistic depiction of muscle deformations in response to shifts in weight and changes in pose. Muscle groups that take on more weight as the character moves can be deformed to depict that burden, and muscle groups that are relieved of weight as the character moves can be deformed to depict their relaxed condition.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A method for animating a character with muscle deformation responsive to kinematic motion and a physical model, the method comprising one or more processors performing the steps of:
   obtaining the kinematic motion and the physical model;
   estimating a first set of estimated joint torques from the obtained kinematic motion and the physical model, said first set of estimated joint torques comprising an artificial load;
   determining an external load corresponding to the artificial load;
   apply the external load to the obtained physical model to produce a loaded physical model; estimate a second set of estimated joint torques from the obtained kinematic motion and the loaded physical model without modifying the obtained kinematic motion;
   determining muscle activations from the second set of estimated joint torques; and
   animating the character with muscle deformation responsive to the muscle activations.

2. The method of claim 1, wherein the physical model comprises a plurality of joints, and wherein the kinematic motion comprises a set of joint angles describing the position of at least one of the plurality of joints and a set of joint angles derivatives describing the derivative of the position of at least one of the plurality of joints.

3. The method of claim 1, the obtaining step comprising: capturing motion to determine the kinematic motion.

4. The method of claim 1, wherein the kinematic motion is obtained from a motion library.

5. The method of claim 1, the obtaining step comprising: determining the kinematic motion from a plurality of keyframes.

6. The method of claim 1, the obtaining step comprising: determining the kinematic motion using procedural animation.

7. The method of claim 1, the obtaining step comprising: filtering the kinematic motion.

8. The method of claim 1, wherein determining the external load comprises estimating a ground reaction load based on the artificial load.

9. The method of claim 8, wherein estimating the ground reaction load comprises the steps of:
   determining a net center of pressure of the ground reaction load;
   determining a torque of the ground reaction load at the net center of pressure;
   determining a force of the ground reaction load at the net center of pressure; and
   distributing the force of the ground reaction load to one or more individual centers of pressure on the physical model.

10. The method of claim 9, wherein applying the external load to the physical model comprises applying the distributed force to the one or more individual centers of pressure on the physical model.

11. The method of claim 9, further comprising the steps of:
    determining that the net center of pressure is outside a polygon of support; and
    responsive to determining that the net center of pressure is outside the polygon of support, moving the net center of pressure.

12. The method of claim 1, wherein the muscle activations are determined subject to a minimum activation constraint.

13. The method of claim 1, further comprising the step of: filtering the determined muscle activations.

14. A computer readable storage medium structured to store instructions executable by a processor for animating a character with muscle deformation responsive to kinematic motion and a physical model, the instructions, when executed cause the processor to:
    obtain the kinematic motion and the physical model;
    estimate a first set of estimated joint torques from the obtained kinematic motion and the physical model, said first set of estimated joint torques comprising an artificial load;
    determine an external load corresponding to the artificial load;
    apply the external load to the obtained physical model to produce a loaded physical model; estimate a second set of estimated joint torques from the obtained kinematic motion and the loaded physical model without modifying the obtained kinematic motion;
    determine muscle activations from the second set of estimated joint torques; and
    animate the character with muscle deformation responsive to the muscle activations.

15. The computer readable storage medium of claim 14, wherein the physical model comprises a plurality of joints, and wherein the kinematic motion comprises a set of joint angles describing the position of at least one of the plurality of joints and a set of joint angles derivatives describing the derivative of the position of at least one of the plurality of joints.

16. The computer readable storage medium of claim 14, further storing instructions to:
    capture motion and determine the kinematic motion.

17. The computer readable storage medium of claim 14, wherein the kinematic motion is obtained from a motion library.

18. The computer readable storage medium of claim 14, further storing instructions to:
    determine the kinematic motion from a plurality of keyframes.

19. The computer readable storage medium of claim 14, further storing instructions to:
    determine the kinematic motion using procedural animation.

20. The computer readable storage medium of claim 14, further storing instructions to:
    filter the kinematic motion.

21. The computer readable storage medium of claim 14, further storing instructions to determine a net center of pressure of the ground reaction load, determine a torque of the ground reaction load at the net center of pressure, determine a force of the ground reaction load at the net center of pressure, and distribute the force of the ground reaction load to one or more individual centers of pressure on the physical model.

22. The computer readable storage medium of claim 21, further storing instructions to apply the external load to the physical model by applying the distributed force to the one or more individual centers of pressure on the physical model.

23. The computer readable storage medium of claim 21, further comprising:
a polygon determiner, configured to determine if the net center of pressure is outside a polygon of support; and
a net center of pressure mover, responsive to the polygon determiner, and configured to move the net center of pressure.

24. The computer readable storage medium of claim 14, further storing instructions to determine muscle activations subject to a minimum activation constraint.

25. The computer readable storage medium of claim 14, further storing instructions to filter the determined muscle activations.

26. A system for animating a character with muscle deformation responsive to kinematic motion and a physical model, the system comprising: means for obtaining the kinematic motion and the physical model; means for estimating a first set of estimated joint torques from the obtained kinematic motion and the physical model, said first set of estimated joint torques comprising an artificial load;
means for determining an external load corresponding to the artificial load;
means for applying the external load to the obtained physical model to produce a loaded physical model;
means for estimating a second set of estimated joint torques from the obtained kinematic motion and the loaded physical model without modifying the obtained kinematic motion;
means for determining muscle activations from the second set of estimated joint torques; and
means for animating the character with muscle deformation responsive to the muscle activations.

27. The system of claim 26, wherein the physical model comprises a plurality of joints, and wherein the kinematic motion comprises a set of joint angles describing the position of at least one of the plurality of joints and a set of joint angles derivatives describing the derivative of the position of at least one of the plurality of joints.

28. The system of claim 26, the obtaining means further comprising:
means for capturing motion to determine the kinematic motion.

29. The system of claim 26, the obtaining means further comprising:
means for determining the kinematic motion from a plurality of keyframes.

30. The system of claim 26, the obtaining means further comprising:
means for determining the kinematic motion using procedural animation.

31. The system of claim 26, the obtaining means further comprising:
means for filtering the kinematic motion.

32. The system of claim 26, wherein the means for determining the external load comprises means for estimating a ground reaction load based on the artificial load.

33. The system of claim 32, wherein the means for estimating the ground reaction load comprises:
means for determining a net center of pressure of the ground reaction load;
means for determining a torque of the ground reaction load at the net center of pressure;
means for determining a force of the ground reaction load at the net center of pressure; and
means for distributing the force of the ground reaction load to one or more individual centers of pressure on the physical model.

34. The system of claim 33, wherein the means for applying the external load to the physical model comprises means for applying the distributed force to the one or more individual centers of pressure on the physical model.

35. The system of claim 33, further comprising:
means for determining that the net center of pressure is outside a polygon of support; and
means, responsive to the means for determining that the net center of pressure is outside the polygon of support, for moving the net center of pressure.

36. The system of claim 26, wherein the muscle activations are determined subject to a minimum activation constraint.

37. The system of claim 26, further comprising:
means for filtering the determined muscle activations.

* * * * *

UNITED STATES PATENT AND TRADEMARK OFFICE
CERTIFICATE OF CORRECTION

| | |
|---|---|
| PATENT NO. | : 7,573,477 B2 |
| APPLICATION NO. | : 11/454711 |
| DATED | : August 11, 2009 |
| INVENTOR(S) | : Victor Ng-Thow-Hing |

Page 1 of 1

It is certified that error appears in the above-identified patent and that said Letters Patent is hereby corrected as shown below:

In claim 1, Column 11, Line 26, replace "apply" with --applying--.

In claim 1, Column 11, Line 27, replace "estimate" with --estimating--.

Signed and Sealed this

Twenty-seventh Day of October, 2009

David J. Kappos
*Director of the United States Patent and Trademark Office*